(12) United States Patent
Ueno et al.

(10) Patent No.: US 8,662,221 B2
(45) Date of Patent: Mar. 4, 2014

(54) ELECTRIC VEHICLE AND ELECTRIC SUPPLY ARRANGEMENT FOR THE SAME

(75) Inventors: Ryuji Ueno, Potomac, MD (US); Misako Nakata, Takatsuki (JP)

(73) Assignee: Rusk Intellecutal Reserve AG, Zug (CH)

( * ) Notice: Subject to any disclaimer, the term of this patent is extended or adjusted under 35 U.S.C. 154(b) by 217 days.

(21) Appl. No.: 12/977,253

(22) Filed: Dec. 23, 2010

(65) Prior Publication Data

US 2011/0186368 A1    Aug. 4, 2011

Related U.S. Application Data

(60) Provisional application No. 61/290,109, filed on Dec. 24, 2009.

(51) Int. Cl.
*B60K 1/00* (2006.01)

(52) U.S. Cl.
USPC ..................... 180/65.31; 180/65.51

(58) Field of Classification Search
USPC ...................... 180/65.51, 65.31, 65.1; 190/10
See application file for complete search history.

(56) References Cited

U.S. PATENT DOCUMENTS

| | | | |
|---|---|---|---|
| 5,855,261 A * | 1/1999 | Odachi et al. | 191/10 |
| 6,471,020 B1 | 10/2002 | Hernandez | |
| 2010/0225271 A1 | 9/2010 | Oyobe et al. | |
| 2011/0220446 A1 * | 9/2011 | Hubner | 191/10 |
| 2012/0186927 A1 | 7/2012 | Suh et al. | |

FOREIGN PATENT DOCUMENTS

| | | |
|---|---|---|
| DE | 198 24 290 A1 | 12/1999 |
| DE | 20 2008 015 230 U1 | 6/2009 |
| JP | 2001-219733 A | 8/2001 |
| JP | 2002-152996 A | 5/2002 |
| JP | 2004-242380 A | 8/2004 |
| JP | 2006-87247 A | 3/2006 |
| JP | 2008-87733 A | 4/2008 |
| JP | 2009-106136 A | 5/2009 |
| JP | 2010-57286 A | 3/2010 |
| JP | 2010-200479 A | 9/2010 |
| JP | 2010-226945 A | 10/2010 |
| JP | 2012-519104 A | 8/2012 |

(Continued)

OTHER PUBLICATIONS

International Search Report—mailed Feb. 6, 2012.

(Continued)

*Primary Examiner* — Jeffrey J Restifo
*Assistant Examiner* — Erez Gurari
(74) *Attorney, Agent, or Firm* — Birch, Stewart, Kolasch & Birch, LLP

(57) ABSTRACT

In an electric vehicle, a power unit is installed in an internal space region of a tire of each of front and rear wheels. The unit has a plurality of power elements arranged on an inner peripheral surface of a ground contact portion of the tire. Each of the elements includes a core made of a permalloy, and a power coil wound around the core. When a periodically-changing magnetic field is generated in a region above a road by an electric supply arrangement installed in the road, each of the elements generates electric power. This electric power is supplied to a motor of the vehicle through a power distribution system. The motor drives front wheels. The electric vehicle can continuously run over long distances without charging a battery at a buttery station.

11 Claims, 9 Drawing Sheets

(56) References Cited

FOREIGN PATENT DOCUMENTS

| WO | WO 2010/034039 | A1 | 4/2010 |
| WO | WO 2010/057799 | A1 | 5/2010 |
| WO | WO 2010/098547 | A2 | 9/2010 |

OTHER PUBLICATIONS

Invitation to Pay Additional Fees and, Where Applicable, Protest Fee—mailed Oct. 31, 2011.

\* cited by examiner

ELECTRIC VEHICLE AND ELECTRIC SUPPLY ARRANGEMENT FOR THE SAME

CROSS REFERENCE TO RELATED APPLICATIONS

This nonprovisional application claims the benefit under 35 U.S.C §119(e) to U.S. Provisional Application No. 61/290,109 filed on Dec. 24, 2009. The entire contents of the above application are hereby incorporated by reference into the present application.

BACKGROUND OF THE INVENTION

The present invention relates to an electric vehicle designed to be supplied with electric power from the outside directly or through electromagnetic induction, during running or stop thereof, and an electric supply arrangement which is installed on/in a road on which the electric vehicle is running or stops, and designed to supply electric power to the electric vehicle directly or through electromagnetic induction.

Heretofore, there has been known a battery-powered electric vehicle which is equipper with a storage battery (secondary battery, rechargeable battery), and designed to rotate a motor by use of electric power stored in the storage battery, and drive wheels (road wheels) by a torque of the motor (see, for example, JP 2001-219733A). Electric vehicles including such a battery-powered electric vehicle are generally simple in structure, and free of emissions of air pollutants such as nitrogen oxides and emissions of carbon dioxide causing global warming. Therefore, from an environmental standpoint, there is a strong need for accelerating diffusion thereof.

However, while the battery-powered electric vehicle requires to charge the storage battery when a charged amount of the storage battery is lowered to a lower limit, there is a problem that it is necessary to take a fairly longtime for the charging operation. For example, in cases where the storage battery is fully charged at a battery charging station, it is necessary to take a charging time of at least 30 minutes, or in cases where the charging operation is performed using a household charger, it is necessary to take a charging time of several hours.

Moreover, in the battery-powered electric vehicle, a runnable (travelable) distance based on one full-charging operation is significantly short as compared with an automobile equipped with a gasoline or diesel engine. In current commercially-available automobiles, the runnable distance is typically in the range of 90 to 160 km, and about 200 km at a maximum. Thus, in driving over a long distance by the battery-powered electric vehicle, it is necessary to frequently stop at a battery charging station and spend a fairly long time to charge the storage battery. Thus, the battery-powered electric vehicle has a problem of causing inconvenience to most users having not a few opportunities of long-distance driving. As above, despite a strong need for accelerating diffusion the battery-powered electric vehicle, it the above problems cause difficulty in actually promoting the diffusion.

SUMMARY OF THE INVENTION

The present invention has been made to solve the above conventional problems, and an object thereof is to provide an electric vehicle capable of continuously running without a need for vehicle stop for battery charging, particularly, over long distances, so as to satisfy both of user convenience and environmental preservation.

In order to achieve the above object, an electric vehicle according to a first aspect of the present invention comprises a plurality of power generating elements disposed in an internal space region of a tire of each of a plurality of wheels, and a motor adapted to be rotated by electric power supplied from the power generating elements through a power distribution system. In this electric vehicle, the plurality of power generating elements disposed to come into contact with (or come close to) the inner peripheral surface of the tire over an entire circumference of an annular-shaped inner peripheral surface of the tire which has a given width. Each of the power generating elements is adapted to generate electric power by electromagnetic induction caused by a periodical change in magnetic field or magnetic flux density applied from the side of a road surface. The motor is adapted to rotationally drive the wheels through a driving-force transmission mechanism. As used here, the term "road surface" means an upper surface of a road, a square, etc, on which the electric vehicle runs or stops.

In the electric vehicle according to the first aspect of the present invention, when each of the power generating elements disposed on the inner peripheral surface of the tire is located at a position close to the road surface during stop of the electric vehicle, or passes through a position close to the road surface according to a rotation of the wheel or the tire during running of the electric vehicle, induced current, i.e., electric power, is generated by a change in magnetic field or magnetic flux density applied from the side of the road surface. Then, electric power generated by the power generating elements is supplied to the motor through the power distribution system, and the motor is rotated by the supplied electric power. A torque of the motor is transmitted to the wheel through the driving-force transmission mechanism. Thus, the wheels are driven to allow the electric vehicle to run. In other words, the electric vehicle can continuously run based on electric power which is supplied from the side of the road surface through electromagnetic induction. Thus, the electric vehicle according to the first aspect of the present invention can continuously run without a need for vehicle stop for battery charging, particularly, over long distances without receiving a battery charging service at a battery charging station or the like, so as to satisfy both of user convenience and environmental preservation.

Preferably, in the electric vehicle according to the first aspect of the present invention, each of the power generating elements includes a core made of an electromagnetic material, for example, a permalloy or a supermalloy which has extremely high relative magnetic permeability, and a power generating coil wound around a side surface of the core. In this case, the core is disposed such that one end surface thereof is in contact with (or in close relation to) the inner peripheral surface of the tire and the other end surface is opposed to a rotational center of the tire. Further, the power generating coil is made of an electrical conductive material, and each of opposite ends of the power generating coil is electrically connected to the power distribution system. According to this feature, each of the power generating elements can generate larger electric power with a simple and compact structure.

Preferably, in the electric vehicle according to the first aspect of the present invention, a ground contact portion (tread portion) of the tire contains a ferromagnetic material. More preferably, the ground contact portion of the tire is made of an elastic material, for example, rubber, which contains one of a powder, a fiber and a net-like body of a ferromagnetic material, for example, a permalloy or a supermalloy. In this case, a relative magnetic permeability of the ground contact portion to be located between the road surface and each of the power generating elements becomes extremely large, so that the power generating element can generate larger electric power.

Preferably, the electric vehicle according to the first aspect of the present invention comprises a storage battery adapted to store an excess part of electric power generated by the power generating elements. In this case, the storage battery is electrically connected to the power distribution system through a rectifier and an inverter. Specifically, the storage battery is adapted, when a part of electric power generated by the power generating elements is unconsumed by the motor, to store the unconsumed excess electric power. Further, the storage battery is adapted, when electric power generated by the power generating elements is less than a required electric power of the motor, or when no electric power is generated by the power generating elements, to supply the stored electric power to the motor. According to this feature, even on a conventional road devoid of the arrangement for generating an electric field in a region above the road surface, the electric vehicle can run based on electric power supplied from the storage battery.

An electric supply arrangement for supplying electric power to the electric vehicle according to the first aspect of the present invention, through electromagnetic induction, comprises magnetic field generation means disposed below and adjacent to a road surface. The magnetic field generation means is adapted to generate a periodically changing magnetic field or a magnetic flux in a region above the road surface over a predetermined range with respect to a given direction, for example, an extending direction of a road.

Preferably, in the above electric supply arrangement, the magnetic field generation means includes: a plurality of magnetic-field generating elements disposed side-by-side in spaced-apart relation to each other in a given direction, for example, the extending direction of the road, wherein each of the magnetic-field generating elements has a magnetic core and a winding; and a power source adapted to supply an alternating-current or pulsating-current power to a winding of each of the magnetic-field generating elements. In this case, the magnetic core is made of a ferromagnetic material. Further, the magnetic core is disposed such that one end surface thereof is exposed to the road surface. The winding is made of an electrical conductive material and wound around a side surface of the magnetic core. Further, each of opposite ends of the winding is electrically connected to the power source.

In the above electric supply arrangement, as substitute for the plurality of magnetic-field generating elements, the magnetic field generation means may include a plurality of lengthwise lines made of an electrical conductive material, and disposed inside a road and adjacent to a road surface thereof to extend parallel to each other along the extending direction of the road. In this case, the power source is adapted to supply an alternating-current or pulsating-current power to each of the lengthwise lines.

Alternatively, in the above electric supply arrangement, as substitute for the plurality of magnetic-field generating elements, the magnetic field generation means may include a plurality of transverse lines made of an electrical conductive material, and disposed inside a road and adjacent to a road surface thereof to extend parallel to each other along an extending direction of the road. In this case, the power source is adapted to supply an alternating-current or pulsating-current power to each of the transverse lines.

An electric vehicle according to a second aspect of the present invention comprises a motor for rotationally driving a plurality of wheels through a driving-force transmission mechanism, a tire made of an electrical conductive material and attached to each of the wheels, and a power distribution system electrically connecting the motor and the tire. In this electric vehicle, the motor is adapted to be driven by electric power which is supplied from an electric supply plate disposed on a road surface, through the tire.

In the electric vehicle according to the second aspect of the present invention, electric power is supplied from the eclectic supply plate disposed on the road surface, to the motor through the tire, and the rotor is rotated by the supplied electric power. A torque of the motor is transmitted to the wheels through the driving-force transmission mechanism. Thus, the wheels are driven to allow the electric vehicle to run. In other words, the electric vehicle can continuously run based on electric power which is supplied from the side of the road surface directly. Thus, the electric vehicle according to the second aspect of the present invention can continuously run without a need for vehicle stop for battery charging, particularly, over long distances without receiving a battery charging service at a battery charging station or the like, so as to satisfy both of user convenience and environmental preservation.

Preferably, in the electric vehicle according to the second aspect of the present invention, the motor is adapted to rotationally drive one (e.g., right and left front wheels) of a front wheel and a rear wheel in the wheels, and the tire made of the electrical conductive material is attached to a remaining one (e.g., right and left rear wheels) of the front and rear wheels. Preferably, the electric vehicle according to the second aspect of the present invention comprises a storage battery adapted, when electric power is supplied from the electric supply plate to the electric vehicle, to store a part or an entirety of the supplied electric power, and, when no electric power is supplied from the electric supply plate to the electric vehicle, to supply the stored electric power to the motor.

An electric supply arrangement for supplying electric power to the electric vehicle according to the second aspect of the present invention comprises a first electric supply plate disposed on one side of the road surface, a second electric supply plate disposed on the other side of the road surface, an insulation section disposed between the first electric supply plate and the second electric supply plate to electrically insulate therebetween, and a power source adapted to apply a voltage between the first electric supply plate and the second electric supply plate.

DETAILED DESCRIPTION OF THE PREFERRED EMBODIMENTS

First Embodiment

With reference to the accompanying drawings, an electric vehicle and an electric supply arrangement according to a first embodiment of the present invention will now be specifically described.

Figure 1:
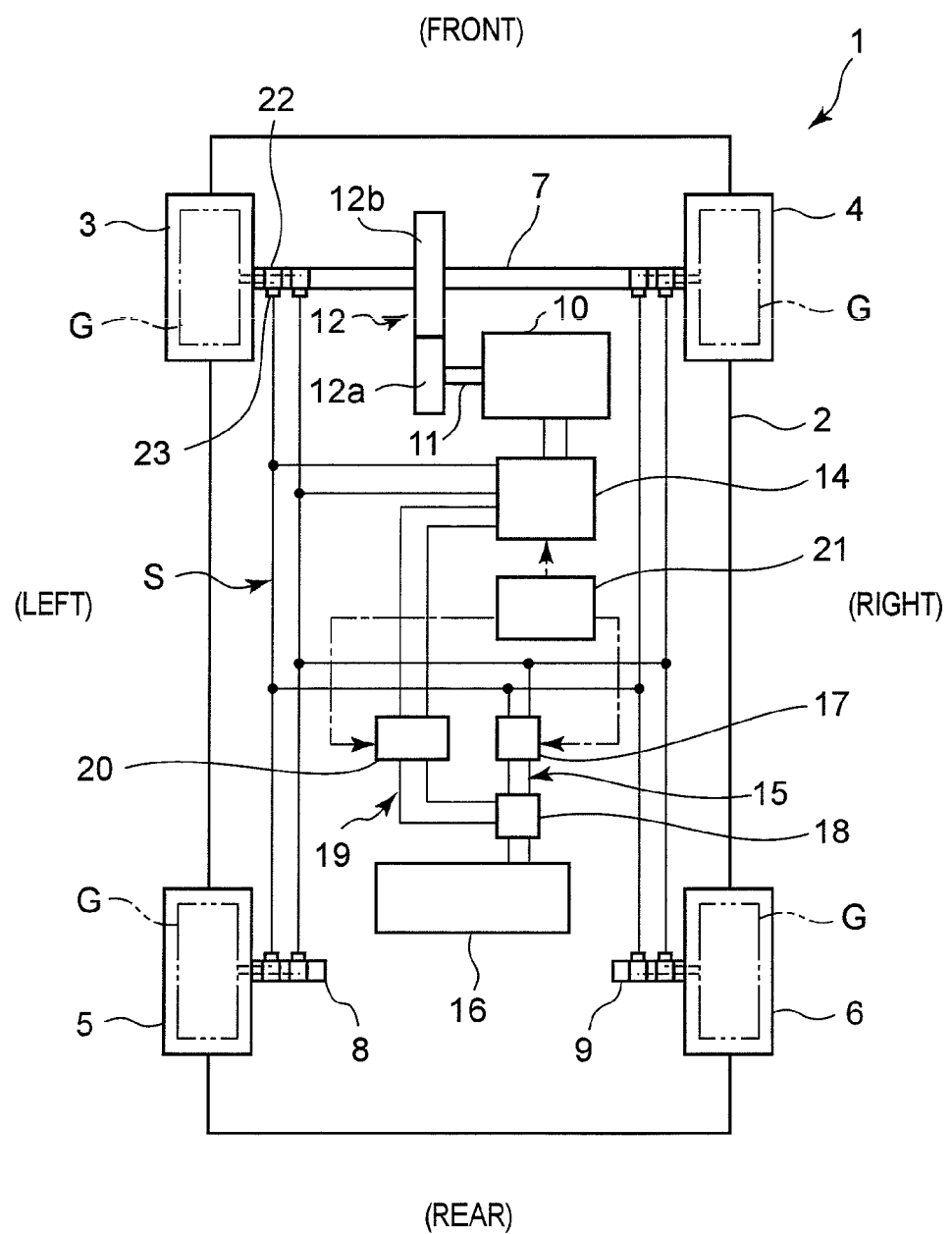
FIG. 1 is a top plan view schematically showing a configuration of an electric vehicle according to a first embodiment of the present invention.

As shown in FIG. 1, in the electric vehicle 1 according to the first embodiment, a left front wheel 3 is provided on a left side of a front region of a vehicle body 2, and a right front wheel 4 is provided on a right side of the front region of the vehicle body 2. Further, a left rear wheel 5 is provided on a left side of a rear region of the vehicle body 2, and a right rear wheel 6 is provided on a right side of the rear region of the vehicle body 2. In this electric vehicle 1, the left front wheel 3 and the right front wheel 4 are drive wheels, and attached to respective ones of a left end and a right end of a single front wheel drive axle 7 in a concentric relation. Each of the left rear wheel 5 and the right rear wheel 6 is a driven wheel, and attached to respective ones of a left rear wheel axle 8 and a right rear wheel axle 9 in a concentric relation. Each of the front wheels 3, 4 or the front wheel drive axle 7, and each of the rear wheels 5, 6 or each of the rear wheel axles 8, 9, are mounted to the vehicle body 2 through non-illustrated suspensions, respectively.

The electric vehicle 1 is equipped with a motor 10 adapted to be rotationally driven by an alternating-current (AC) power, as a driving source thereof. A drive gear 12*a* as a component of a speed reduction gear pair 12 is attached to an output shaft 11 of the motor 10 in a concentric relation. Further, a driven gear 12*b* as a component of the speed reduction gear pair 12 is attached to the front wheel drive axle 7. The drive gear 12*a* and the driven gear 12*a* are meshed with each other to allow the speed reduction gear pair 12 to transmit a rotation of the output shaft 11 of the motor 11 to the front wheel drive axle 7 while reducing a rotation speed at a given speed reduction ratio (e.g., 2 to 6 in terms of a torque ratio). Thus, when the output shaft 11 of the motor 10 is rotated, an output torque of the output shaft 11 is transmitted to the left front wheel 3 and the right front wheel 4 through the speed reduction gear pair 12 and the front wheel drive axle 7, so that the electric vehicle 1 can start running.

A power supply system for supplying electric power to the motor 10 will be described below. In the electric vehicle 1, electric power for driving the motor 10 is generated by four power generating units G each provided in a respective one of the front wheels 3, 4 and the rear wheels 5, 6. A specific structure and function of the power generating unit G will be described later. Each of the power generating unit G is electrically connected to the motor 10 through a power distribution system S in which a motor control device 14 is inserted.

The power supply system is provided with a storage-battery line 15 branched and extended from the power distribution system S. The storage-battery line 15 has a distal end connected to a storage battery 16 which is a secondary battery. A rectifier 17 for rectifying AC power, and a changeover switch 18, are inserted in the storage-battery line 15. The power supply system is further provided with an inverter line connecting the changeover switch 18 and the motor control device 14, wherein an inverter 20 is inserted in the inverter line 19 to convert direct-current (DC) power to AC power having an arbitrary frequency. In order to transmit electric power from a line of the power distribution system S on the side of the rotating wheels to a line of the power distribution system S on the side of the non-rotating vehicle body without any problem, a ring-shaped terminal 22 is attached to each of the front wheel drive axle 7 and the rear wheel drive axles 8, 9, and a brush 23 are provided on the vehicle body in such a manner as to slidably contact the ring-shaped terminal 22.

In the above power supply system, AC power generated by the power generating units G is fundamentally supplied to the motor 10 through the motor control device 14. The motor control device 14 is operable, according to an instruction signal applied thereto from a controller 21 depending on an amount of depression of an accelerator pedal (not illustrated), the presence or absence of a brake operation, etc., to control electric power to be supplied to the motor 10. Thus, the motor 10 fundamentally outputs a torque corresponding to the amount of depression of an accelerator pedal (not illustrated), i.e., a required torque. The controller 21 is a computer-equipped unit for comprehensively controlling the electric vehicle 1.

When total AC power generated by the power generating units G is greater than electric power required for the motor 10, i.e., required power of the motor 10, an excess part of the AC power is rectified by the rectifier 17, and resulting DC power is supplied to the storage battery 16 through the changeover switch 18. In this manner, the storage battery 16 is charged. During this operation, the inverter line 19 is cut off by the changeover valve 18 which is controlled by the controller 21. Thus, no electric power is supplied to the inverter 20, and therefore to the motor 10.

Otherwise, when the total AC power generated by the power generating units G is less than the required power of the motor 10, or no electric power is generated by the power generating units G, DC power stored in the storage battery 16 is supplied to the inverter 20 through the changeover switch 18. Then, the inverter 20 is operable, according to an instruction signal applied thereto from the controller 21, to generate AC power having a frequency suitable for supply to the motor 10.

More specifically, the inverter is operable to supply a difference between the required power of the motor 10 and total power generated by the power generating units G, i.e., deficient power, to the motor 10. During this operation, the storage-battery line 15 is cut off by the changeover switch 18 which is controlled by the controller 21. Thus, no electric power is supplied from the power generating units G to the rectifier 17 and therefore to the storage battery 16. It is understood that, when no electric power is generated by the power generating units G, all of the required power of the motor 10 is supplied only from the storage battery to the motor 10 through the inverter 20.

A specific structure and function of the power generating unit G provided in each of the front wheels 3, 4 and the rear wheels 5, 6 will be described below. Although the following description will be made by taking the power generating unit G provided in the left front wheel 3 as an example, it is understood that this description is applicable to the remaining the power generating units G.

Figure 2:
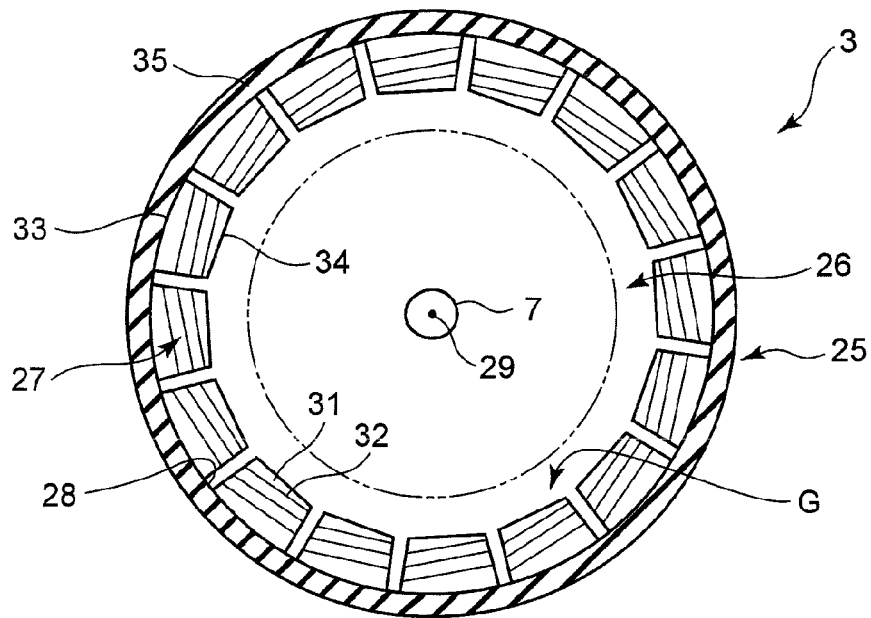
FIG. 2 is a schematic partially-sectional side view of a tire provided with a plurality of power generating elements.
Figure 3:
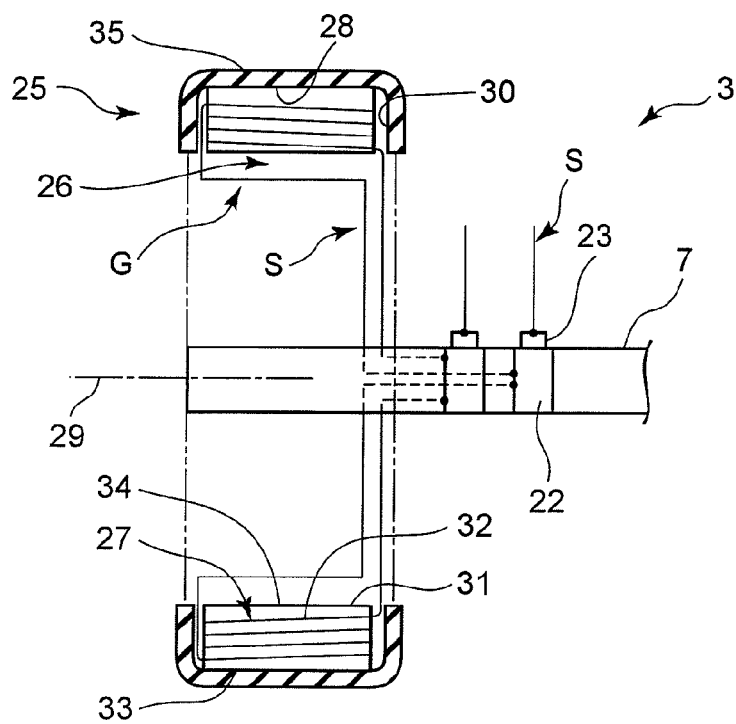
FIG. 3 is a schematic partially-sectional front view of the tire provided with the power generating elements.

As shown in FIGS. 2 and 3, in the left front wheel 3, the power generating unit G is disposed in an internal space region 26 of a tire 25 thereof. The power generating unit G comprises a plurality of power generating elements 27. Although the power generating unit G in the embodiment illustrated in FIGS. 2 and 3 comprises sixteen power generating elements 27, it is understood that the number of the power generating elements 27 is not limited to 16, but may be less than or greater than 16. In FIG. 2, the two-dot chain line indicates an inner peripheral edge of the tire 25.

The power generating elements 27 are arranged side-by-side in equally spaced-apart relation in a circumferential direction to form a single array, in such a manner that one end thereof comes into contact with an annular-shaped inner peripheral surface 28 of the tire 25 which has a given width, over the entire circumference of the inner peripheral surface 28. In other words, the sixteen power generating elements 27 are arranged in an annular ring shape at respective positions where a center angle of each of the power generating elements 27 with respect to a rotational center 29 of the tire 25 is 22.5 degree. In this embodiment, adjacent ones of the power generating elements 27 are arranged with a given distance therebetween, for example, a distance of 2 to 5 cm, in the circumferential direction of the tire. Further, a dimension of each of the power generating elements 27 in a widthwise direction of the tire is set to be maximized. For example, it is set to be 80 to 90% of a distance between opposed inner side surfaces 30 of the tire.

The power generating element 27 includes a truncated pyramid-shaped or generally rectangular parallelepiped-shaped core 31 made of a ferromagnetic material, and a power generating coil 32 made of an electrical conductive material (e.g., copper) and wound around a side surface of the core 31. The power generating coil 32 has an outer peripheral surface coated with an insulating film or an insulating material. In this embodiment, one end surface 33 of the core 31 (hereinafter referred to as "core outer end surface 33") is in contact with the inner peripheral surface 28 of the tire. The core outer end surface 33 is formed in a slightly curved shape to be engageable with inner peripheral surface 28 of the tire. Further, the other end surface 34 of the core 31 (hereinafter referred to as "core inner end surface 34") is opposed to the rotational center 29 of the tire 25. The core inner end surface 34 is formed in a planar shape.

As the ferromagnetic material of the core 31, it is preferable to use a permalloy or a supermalloy. The permalloy or the supermalloy has an extremely high relative magnetic permeability (e.g., 100000 to 1000000), so that it becomes possible to reduce size and weight of the core 31, or significantly enhance power generation performance of the power generating element 27. However, the ferromagnetic material of the core 31 is not limited to a permalloy or a supermalloy, but any other low-cost ferromagnetic material, such as iron, cobalt, nickel or a commonly-used alloy thereof, may be used, although the power generation performance of the power generating element 27 will deteriorate to some extent.

The power generating coil 32 is comprised of a single conductor wire (may be a plurality of conductor wires), and wound around the side surface of the core 31 in close or gapless relation therewith and in a multilayered manner (e.g. 10 to 20 layers) in order to enhance the power generation performance of the power generating element 27. Further, each of two opposite ends of the power generating coil 32 is electrically connected to the power distribution system S (see FIG. 1). Thus, the power generating element 27 is operable, when a periodically or temporally changing or fluctuating magnetic field or magnetic flux (hereinafter referred to as "alternating magnetic field") is generated therearound, to generate electric power through electromagnetic induction and output the generated electric power to the power distribution system S.

A ground contact portion 35 or tread portion of the tire 25, i.e., an annular-shaped peripheral portion of the tire 25 which has a given width, is made of an elastic material containing one of a powder, a fiber and a net-like body of a ferromagnetic material. As the ferromagnetic material, it is preferable to use a permalloy or a supermalloy, in view of its extremely high relative magnetic permeability. As the elastic material, it is preferable to use rubber, in view of its excellent ground-contactability. In order to increase the relative magnetic permeability of the ground contact portion 35, a content rate or content amount of the ferromagnetic material in the ground contact portion 35 is preferably maximized to an extent that running performance of the tire 25 is spoiled. The tire 25 may be entirely made of the ferromagnetic material-containing elastic material. Further, a ferromagnetic material other than the permalloy or the supermalloy, such as iron, cobalt, nickel or a commonly-used alloy thereof, may be used.

The power generating element 27 can generate electric power through electromagnetic induction caused by alternating magnetic field applied from the side of a road. Further, the relative magnetic permeability of the ground contact portion 35 is significantly increased by forming the ground contact portion 35 using the ferromagnetic material-containing elastic material, as mentioned above, so that it becomes possible to significantly enhance the power generation performance of the power generating element 27. As used here, the term "maximum magnetic flux density" means a maximum value of the periodically changing magnetic flux density. As the maximum magnetic flux density becomes larger, a variation width or a changing rate becomes larger, and thereby the power generation performance of the power generating element 27 becomes higher.

Figure 4:
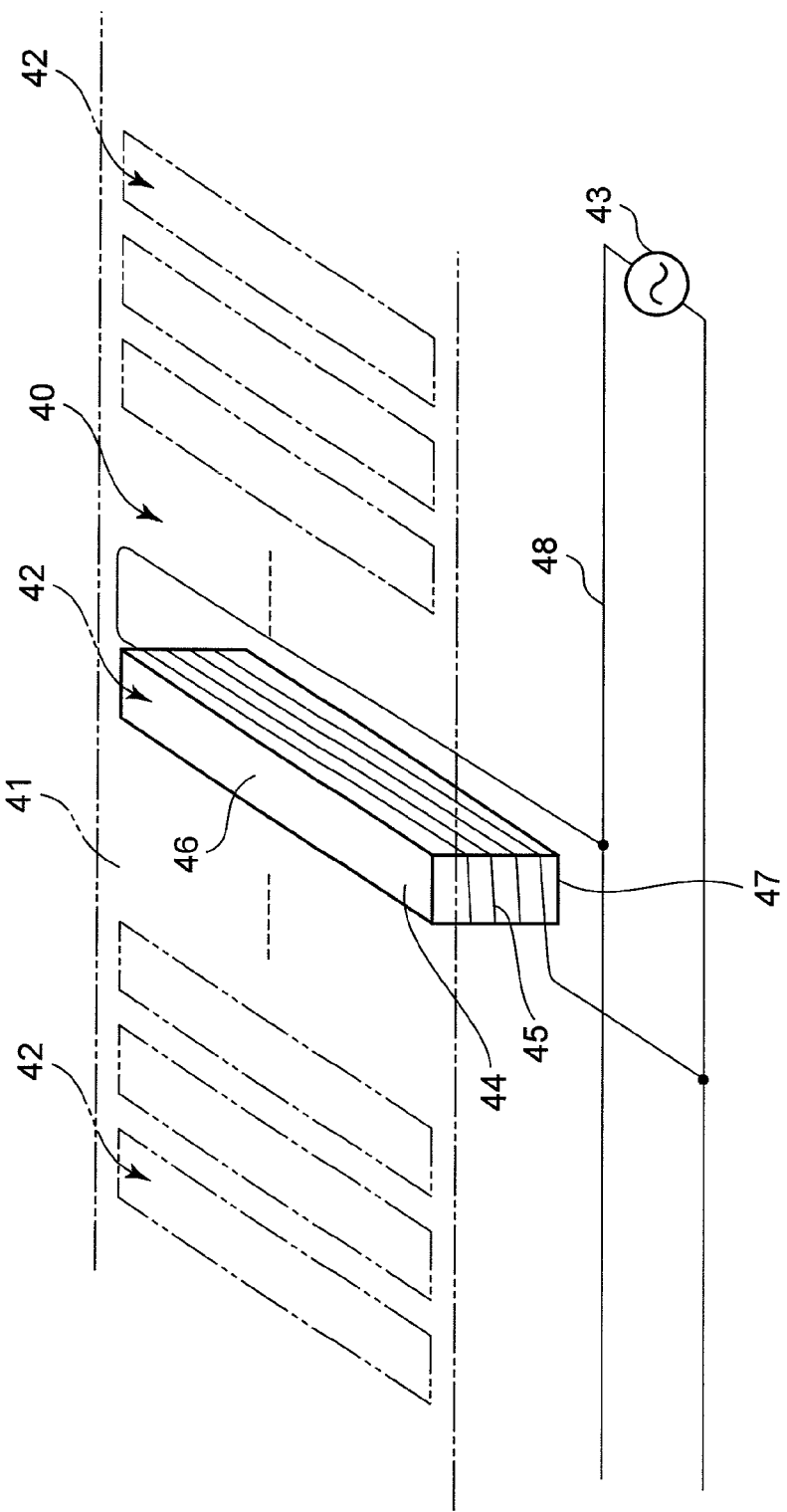
FIG. 4 is a schematic perspective view of an electric supply arrangement installed in a road and used for the electric vehicle illustrated in FIG. 1.

With reference to FIG. 4, a specific structure and function of an electric supply arrangement for generating an alternating magnetic field in a region above a road surface will be described below. As shown in FIG. 4, the electric supply arrangement 40 comprises a plurality of or a large number of (e.g., one million to ten million) magnetic-field generating elements 42 disposed in spaced-apart relation to each other in an extending direction of a road 41, and a power source 43 for supplying AC power to each of the magnetic-field generating elements 42. In the electric supply arrangement 40, in place of the AC power source, a DC power source for supplying pulsating-current (PS) power may be used. Although FIG. 4 illustrates such that the power source 43 supplies electric power only to the electric-field generating element 42, in an abbreviated form, it is understood that the power source 43 also supplies electric power to each of the remaining electric-field generating element 42.

The electric-field generating elements 42 are arranged side-by-side in evenly spaced-apart relation with a given distance (e.g., 10 to 50 cm) between adjacent ones thereof in the extension direction of the road 41 to form a single array. Each of the electric-field generating elements 42 has a given length (e.g., 5 to 20 cm) in the extending direction of the road 41, and a length extending over an approximately entire width of the road 41 in a widthwise direction of the road 42.

The electric-field generating element 42 includes a rectangular parallelepiped-shaped or generally rectangular parallelepiped-shaped magnetic core 44 made of a ferromagnetic material, and a winding 45 made of an electrical conductive material (e.g., copper) and wound around a side surface of the magnetic core 44. The winding 45 has an outer peripheral surface coated with an insulating film or an insulating material. The magnetic core 44 is disposed such that each of one end surface 46 thereof (hereinafter referred to as "magnetic-core upper end surface 46") and the other end surface 47 (hereinafter referred to as "magnetic-core lower end surface 47") becomes parallel or approximately parallel to a road surface of the road 41.

The magnetic-core upper end surface 46 is exposed to the road surface in such a manner as to prevent a step from being formed between the magnetic-core upper end surface 46 and a region of the road surface therearound. Thus, a surface of the road 41 is generally flat, so that the magnetic core 44 does not cause any problem in the running of the electric vehicle 1. In order to protect the magnetic core 44, the magnetic-core upper end surface 46 may be protectively coated with synthetic resin or the like. As the ferromagnetic material of the magnetic core 44, it is preferable to use a relatively low-cost ferromagnetic material, such as iron, cobalt, nickel or a commonly-used alloy thereof, because an enormous amount of ferromagnetic material is required for the magnetic core 44.

In each of the electric field generating elements 42, the winding 45 is comprised of a single conductor wire (may be a plurality of conductor wires), and wound around four side surfaces of the magnetic core 42 (surfaces other than the magnetic-core upper end surface 46 and the magnetic-core lower end surface 47) in close or gapless relation therewith and in a multilayered manner (e.g. 50 to 100 layers), in order to enhance magnetic field generation performance of the magnetic field generating element 42. Further, each of two opposite ends of the winding 45 is electrically connected to the power source 43 through an electric supply line 48. Thus, the electric field generating element 42 is operable, when AC power is supplied thereto from the power source 43, to generate an alternating magnetic field in a region above the road surface through electromagnetic induction.

Figure 5:
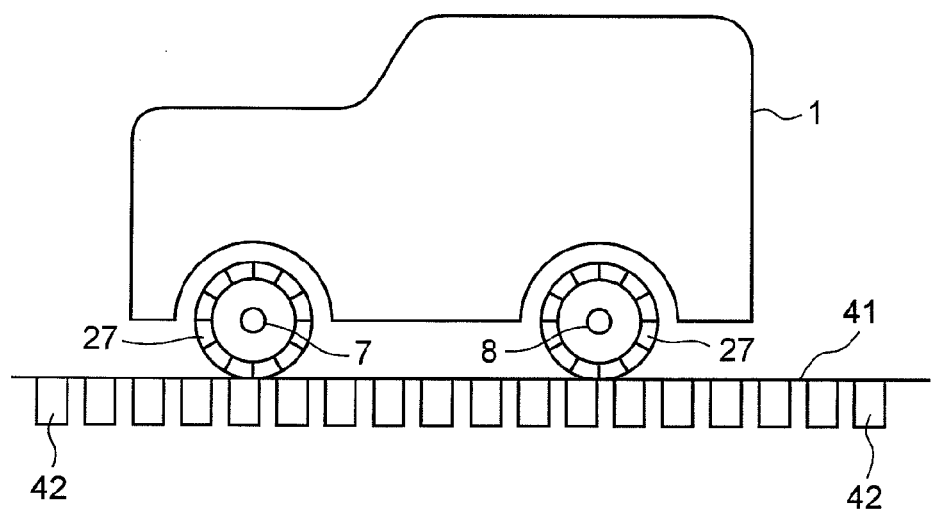
FIG. 5 is a schematic diagram of the electric vehicle illustrated in FIG. 1 in a state when it is running on the road.

With reference to FIG. 5, a mechanism for causing the electric vehicle 1 to run on the road 41 having the electric supply arrangement 40 or a mechanism for charging the storage battery 16 will be described below. As shown in FIG. 5, in response to supplying AC power from the power source 43 (see FIG. 4) to the magnetic field generating elements 42 of the electric supply arrangement 40 when the electric vehicle 1 stops on the road 41, or is running on the road 41, an alternating magnetic field is generated in a region above the road surface over the entire area of the road 41. In the alternating magnetic field, the maximum magnetic flux density becomes significantly large in a region adjacent to the road surface (e.g., a region from the road surface to a position above the road surface by 10 cm), and sharply decreases in a direction away from the height position upwardly.

As above, an alternating magnetic field having a significantly large maximum magnetic flux density is generated in a region above and adjacent to the road surface of the road 41. Thus, when a specific one of the plurality of power generating elements 27 disposed within the tire 25 of the electric vehicle 1 is located in a region close to the road surface, e.g., located just above a region of the ground contact portion 35 (see FIG. 2) of the tire 25 in contact with the road surface, it generates electric power through electromagnetic induction.

Further, the ground contact portion of the tire 25 to be located between the road surface and the core outer end surface 33 of each of the power generating elements 27 has a significantly large relative magnetic permeability, as mentioned above. Thus, the maximum magnetic flux density or the magnet flux changing rate of the magnetic field around the specific power generating element 27 becomes larger, so that the specific power generating element 27 generates relatively large electric power. During running of the electric vehicle 1, the power generating elements 27 are sequentially located at a position close to the road surface in a repetitive manner, and each of the power generating elements 27 generates electric power when it passes through the position. Thus, at least one of the power generating elements 27 can generate electric power both during stop and during running of the electric vehicle 1.

As above, in the electric vehicle 1 on the road 41 having the electric supply arrangement 40, electric power is generated in each of the power generating units G in the front wheels 3, 4 and the rear wheels 5, 6, so that total electric power generated by the power generating units G becomes a large value enough to allow the electric vehicle 1 to normally run. In addition, an excess part of electric power generated by the power generating units G is stored in the storage battery 16, as mentioned above, so that the electric vehicle 1 can run without any problem even when the required power of the motor 10 is greater than total electric power generated by the power generating units G, or the electric vehicle 1 is running on a road devoid of the electric supply arrangement 40. Further, during stop of the electric vehicle 1, electric power generated by the power generating units G is entirely supplied to the storage battery 16 to rapidly charge the storage battery 16.

In this manner, the electric vehicle 1 can continuously run over long distances, based on electric power supplied from the electric supply arrangement 40 provided in the road 41. Therefore, the electric vehicle 1 according to the first embodiment can satisfy both user convenience and environmental preservation.

In the first embodiment, the electric supply arrangement 40 provided in the road 41 comprises the plurality or large number of electric-field generating elements 42, and the power source 43. However, the electric supply arrangement in the present invention is not limited to the type of electric supply arrangement 40, but may be any other suitable type which is operable, when AC or PC power is supplied thereto from the power source 43, to generate an alternating magnetic field in a region above the road surface at a level capable of supplying sufficient electric power to the electric vehicle 1.

Figure 6:
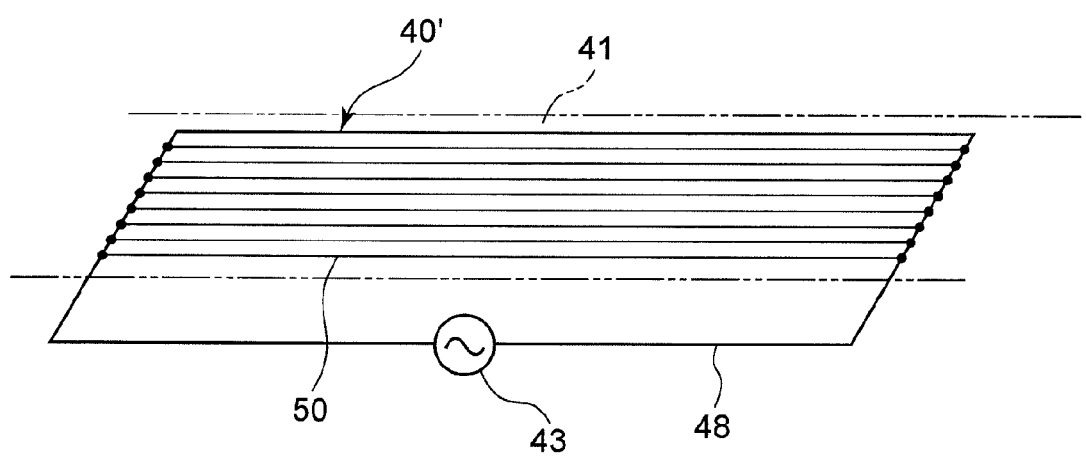
FIG. 6 is a schematic perspective view of one example of modification of the electric supply arrangement installed in a load

For example, as shown in FIG. 6, an electric supply arrangement 40' may be employed which comprises a plurality of lengthwise conductive lines 50 disposed inside the road 41 and adjacent to the road surface to extend parallel to each other along an extending direction of the road 41, and a power source 43 adapted to supply an AC or PC power to each of the lengthwise lines. In this case, a structure of the electric supply arrangement 40' is significantly simplified.

Figure 7:
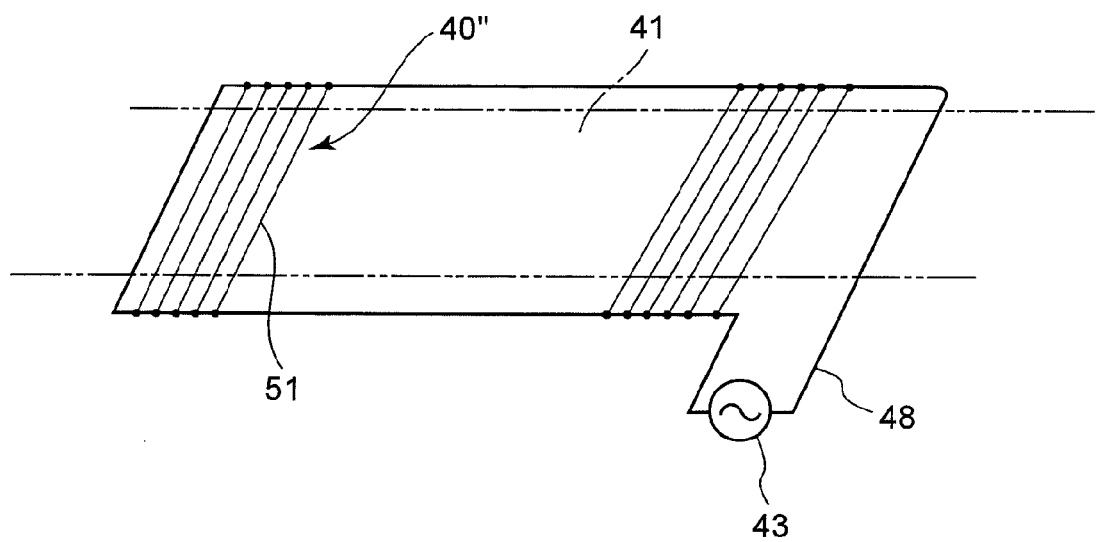
FIG. 7 is a schematic perspective view of another example of modification of the electric supply arrangement installed in a load

Alternatively, as shown in FIG. 7, an electric supply arrangement 40" may be employed which comprises a plurality of transverse conductive lines 51 disposed inside the road 41 and adjacent to the road surface to extend in parallel to each other in a direction intersecting the extending direction of the road 41, for example, in a widthwise direction of the road 41, and a power source 43 adapted to supply an AC or PC power to each of the lengthwise lines. In this case, a structure of the electric supply arrangement 40" is also significantly simplified.

In the first embodiment, the power generating unit G is provided in each of the front wheels 3, 4 and the rear wheels 5, 6. Alternatively, it may be provided only in each of the front wheels 3, 4, or may be provided only in each of the rear wheels 5, 6. In the first embodiment, the power generating elements 27 are arranged in the circumferential direction of the inner peripheral surface 28 of the tire to form a single array. Alternatively, a configuration may be employed in which the dimension of each of the power generating elements 27 in the widthwise direction is set to a smaller value, and the power generating elements 27 are arranged in the circumferential direction of the inner peripheral surface 28 of the tire to form a plurality of parallel arrays. In the first embodiment, each of the electric supply arrangements 40, 40', 40" is installed in a road. However, each of the electric supply arrangements 40, 40', 40" may be installed in any suitable ground other than a road, for example a square, a field or a passage of an amusement park, as long as it allows the electric motor 1 to run or stop thereon.

Second Embodiment

With reference to FIGS. 8 to 11, an electric vehicle and an electric supply arrangement according to a second embodiment of the present invention will now be specifically described. In the second embodiment, a common component to the first embodiment illustrated in FIGS. 1 to 7 is defined by the same reference numeral or code as that in the first embodiment to avoid duplicated description, and its detailed description will be omitted. Therefore, in this specification, the description of the first embodiment is fundamentally applicable to the second embodiment, unless otherwise inconsistent with the following description.

As mentioned above, in the first embodiment 1, based electric power generated by the power generating units G provided inside the tire 25, through electromagnetic induction, the motor 10 is driven, or the storage battery 16 is charged. In other words, electric power or current is not supply directly from the side of the roads to the electric vehicle 1. Differently, in the second embodiment, a tire 25 of each of a left rear wheel 5 and a right rear wheel 6 is made of an electrical conductive material, and electric power or current is supplied from a pair of right and left electric supply plate 54, 53 provided on a road 41 (see FIGS. 9 and 11), directly to a motor 10 or a storage battery 16 through each tire 25.

Figure 8:
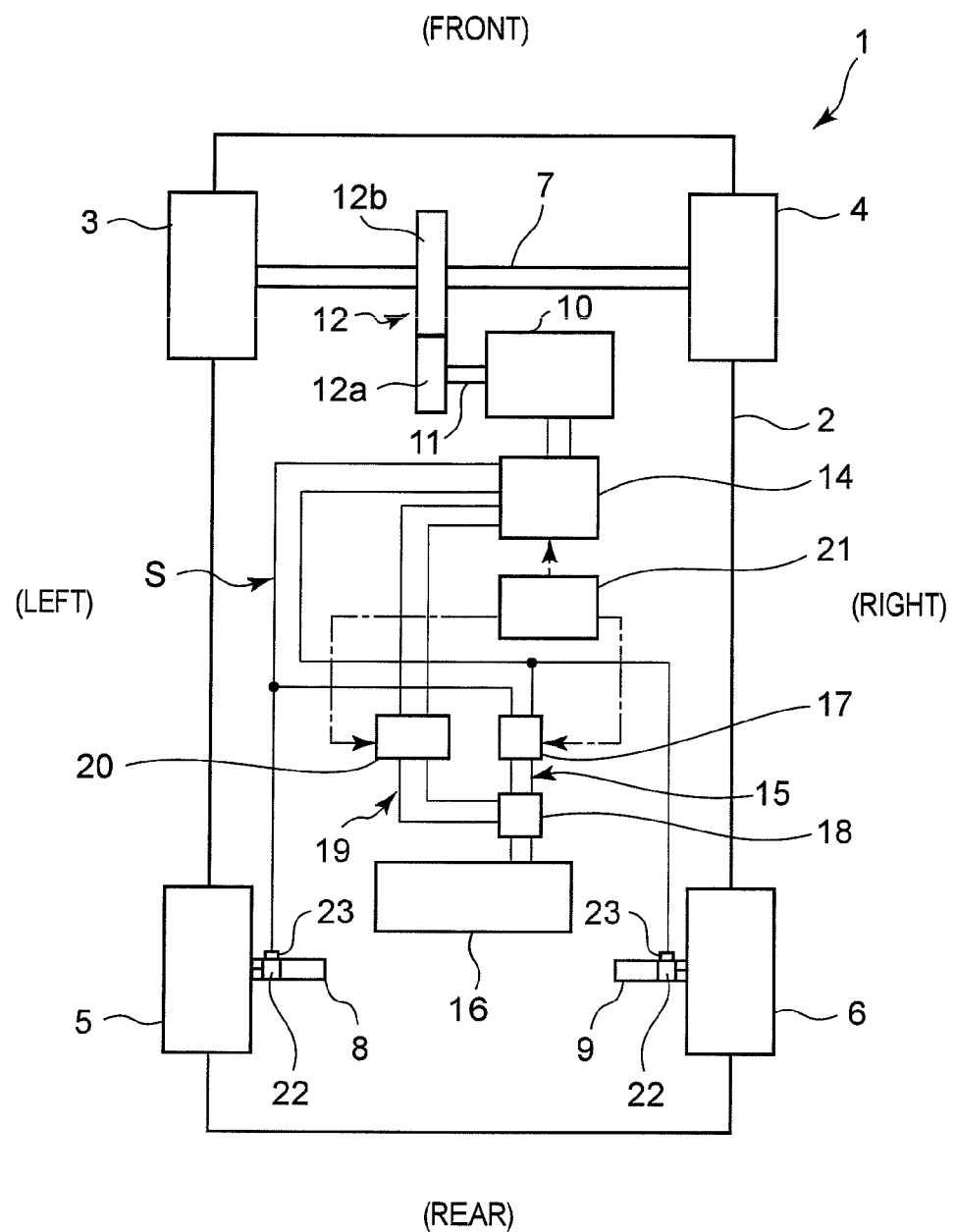
FIG. 8 is a top plan view schematically showing a configuration of an electric vehicle according to a second embodiment of the present invention.
Figure 9:
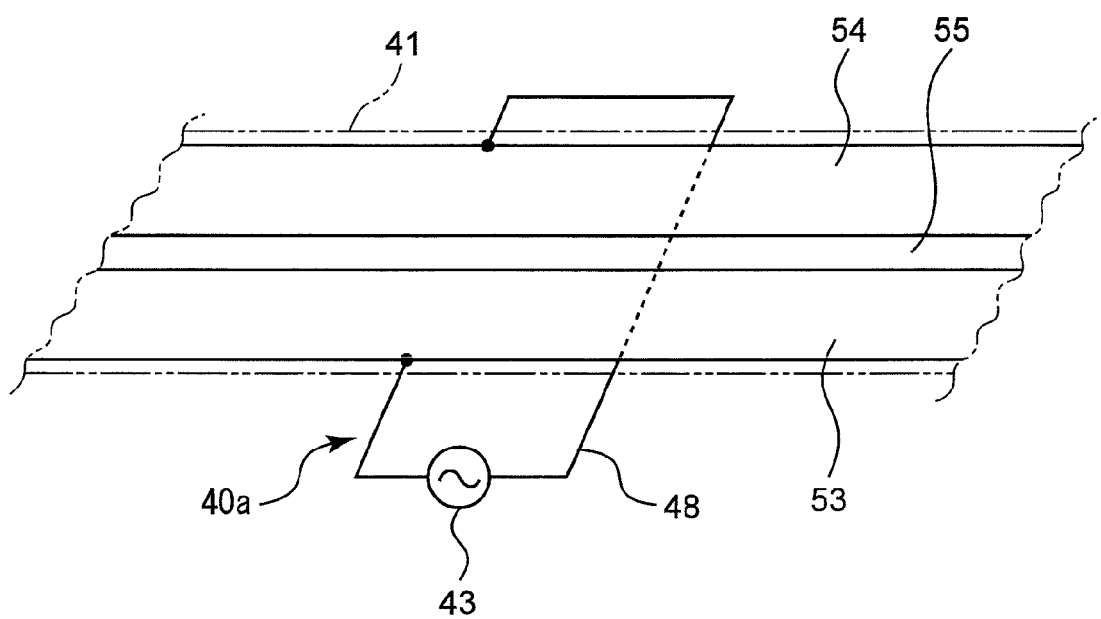
FIG. 9 is a schematic perspective view of an electric supply arrangement installed in a road and used for the electric vehicle illustrated in FIG. 8.

As shown in FIGS. 8 and 9, in the electric vehicle 1 according to the second embodiment 2, each of the tires 25 of the left rear wheel 5 and the right rear wheel 6 is made of an electrical conductive material, such as electrical conductive rubber. On the other hands, a tire 25 of each of a left front wheel 3 and a right front wheel 4 is a conventional tire, i.e., is not made of an electrical conductive material. In this electric vehicle 1, the motor 10 is adapted to drive the left front wheel 3 and the right front wheel 4, as with the first embodiment. Further, the tires 25 of the left rear wheel 5 and the right rear wheel 6 are insulated from each other, and connected to a corresponding ones of two terminals of a power distribution system S. Specifically, the tires 25 of the left rear wheel 5 and the right rear wheel 6 are electrically connected to corresponding ones of two input terminals of a motor control device 14 through the power distribution system S. Further, the tires 25 of the left rear wheel 5 and the right rear wheel 6 are electrically connected to the storage battery through the power distribution system S and through a rectifier 17, a storage-battery line 15 and a switchover switch 18.

An electric supply arrangement 40a is installed in a road 41 to supply AC power to the electric vehicle 1. This electric supply arrangement 40a comprises an AC power source 43, a power supply line 48, first and second electric supply plates 53, 54, and an insulation section 55. The first electric supply plate 53 is disposed on a left half of the road 41 to extend in an extending direction of the road 41. The first electric supply plate 53 is connected to one of two terminals of the AC power source 43 through the power supply line 48. On the other hands, the second electric supply plate 54 is disposed on a right half of the road 41 to extend in the extending direction of the road 41. The second electric supply plate 54 is connected to the other terminal of the AC power source 43 through the power supply line 48.

The insulation section 55 is disposed in an approximately widthwise central area of the road 41 in adjacent relation to the first and second electric supply plates 53, 54 to electrically insulate therebetween. The AC power source 43 is adapted to apply a voltage between the first electric supply plate 53 and the second electric supply plate 54, through the power supply line 48. In the second embodiment, it is preferable to set a width of the road 41 in such a manner that, even if the electric vehicle 1 is located in any widthwise position of the road 41, the tire 25 of the left wheel never enter the right half of the road 41 (i.e., is located only in the left half), and the tire 25 of the right wheel 6 never enter the left half of the road 41 (i.e., is located only in the right half).

For this purpose, the width of the road 41 is set to be 1.5 to 1.8 times of a width of the electric vehicle 1. This makes it possible to reliably supply electric power from the electric supply plates 53, 54 to the electric vehicle 1, irrespective of a position of the electric vehicle 1.

Thus, when the electric vehicle 1 is running on the road 41 having the electric supply arrangement 40a installed thereon, or stops on the road 41, AC power is supplied from the first and second electric supply plates 53, 54 to the power distribution system S of the electric vehicle 1 through the tires 25 of the left and right rear wheels 5, 6. Then, the electric power supplied to the power distribution system S is supplied to the motor 10 through the motor control device 14, in the same manner as that in the first embodiment. The electric power is also supplied to the storage battery 16 through the rectifier 17, the storage-battery line 15 and the changeover switch 18. Except for the difference in the technique for power supply to the power distribution system S, the electric vehicle 1 according to the second embodiment is approximately the same as the electric vehicle 1 according to the first embodiment.

As described above, in the electric vehicle 1 illustrated in FIGS. 8 and 9, AC power is supplied from the electric supply arrangement 40a to the electric vehicle 1. Further, the motor 10 as a driving source of the electric vehicle 1 is an AC motor adapted to be driven by AC power. However, in the second embodiment, DC power may be supplied from the electric supply arrangement 40a to the electric vehicle 1, while using a DC motor as the motor 10.

Figure 10:
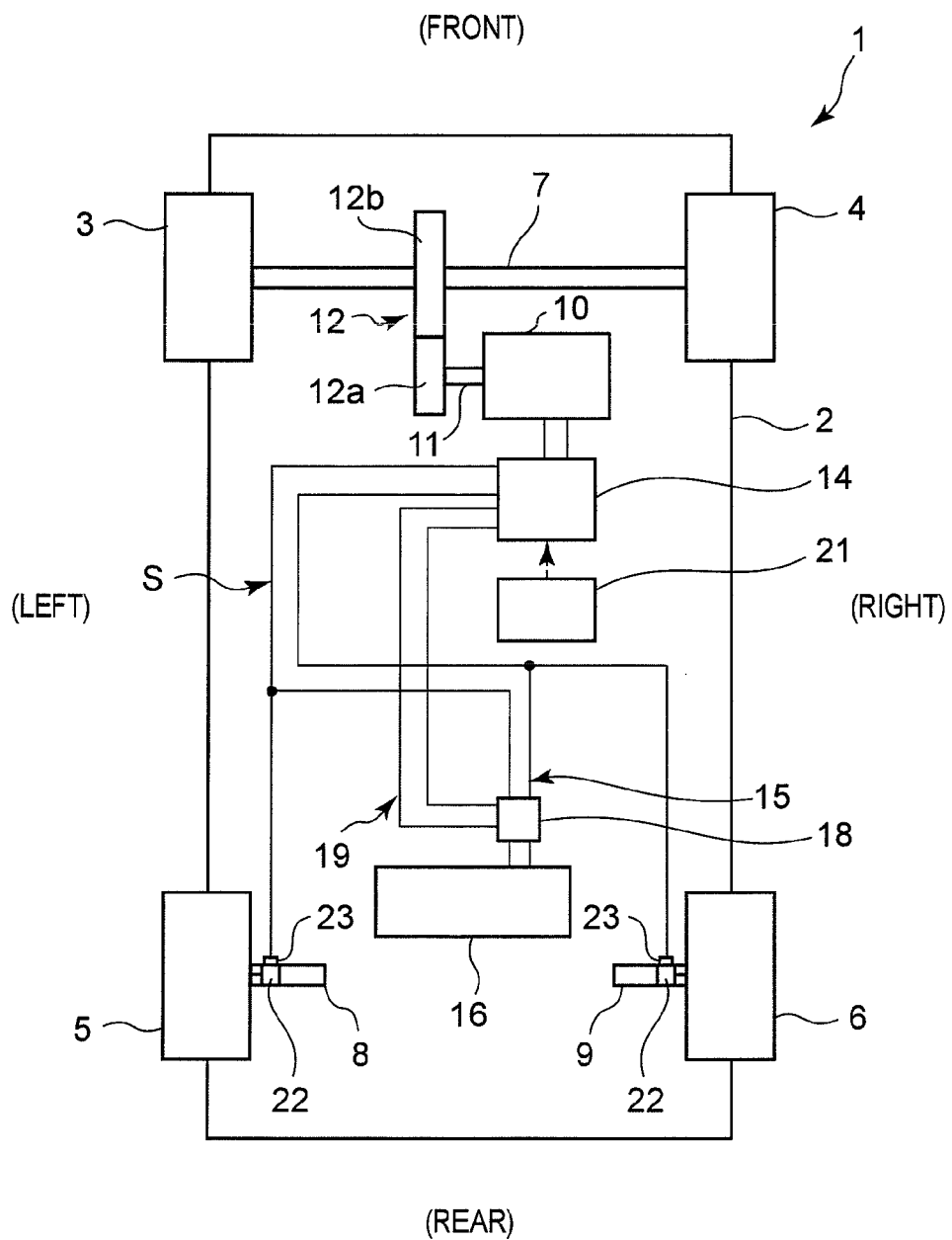
FIG. 10 is a top plan view schematically showing a configuration of one example of modification of the electric vehicle according to the second embodiment of the present invention.
Figure 11:
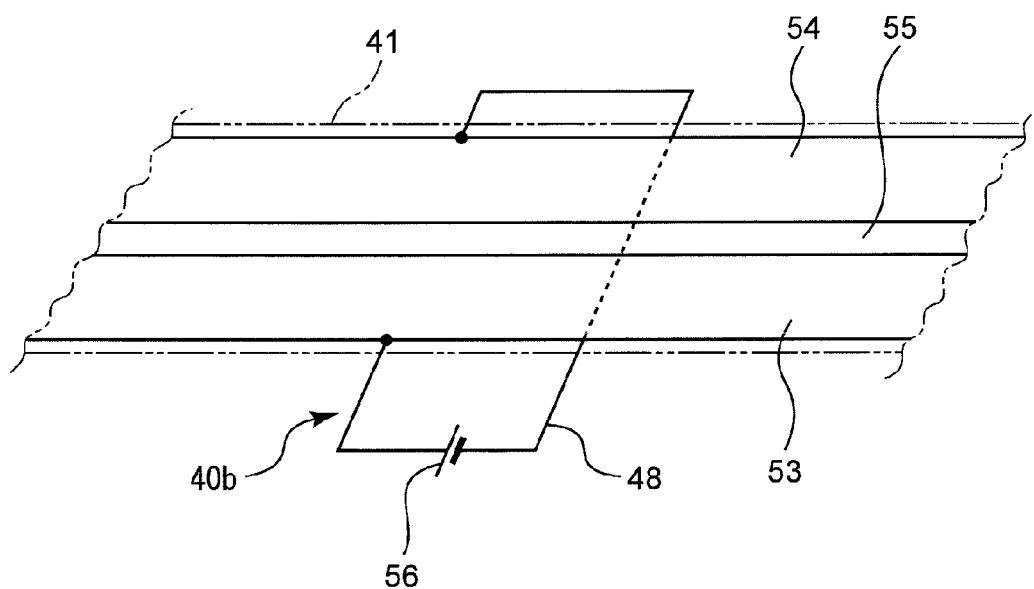
FIG. 11 is a schematic perspective view of an electric supply arrangement installed in a road and used for the electric vehicle illustrated in FIG. 10.

FIGS. 10 and 11 show respective configurations of an electric vehicle 1 using a DC motor as the motor 10, and an electric supply arrangement 40a for supplying DC power to the electric vehicle 1. Electric power to be used in this electric vehicle 1 entirely consists of DC power without using AC power. Thus, differently from the electric vehicle 1 illustrated in FIG. 8, the rectifier 17 and the inverter 20 are not provided in this electric vehicle 1. Further, the electric supply arrangement 40b is provided with a DC power source 56.

Thus, in the second embodiment, AC or DC power is supplied from the electric supply plates 53, 54 installed on the road 41, to the tires 25, so that the electric vehicle 1 can run based on the supplied power. In other words, the electric vehicle 1 can continuously run based on electric power supplied from the side of the road. Thus, the electric vehicle 1 can continuously run without a need for vehicle stop for battery charging, particularly, over long distances without receiving a battery charging service at a battery charging station or the like, so as to satisfy both of user convenience and environmental preservation.

Although the present invention has been described in relation to specific embodiments thereof, it is to be understood that various changes and modifications will be apparent to those skilled in the art. Therefore, the present invention is not limited by the specific embodiments, but only by the appended claims.

What is claimed is:

1. An electric vehicle comprising:
   a plurality of power generating elements disposed in an internal space region of a tire of each of a plurality of wheels in such a manner as to come into contact with the inner peripheral surface of the tire over an entire circumference of an annular-shaped inner peripheral surface of the tire, and each adapted to generate electric power by electromagnetic induction caused by a periodical change in magnetic field applied from the side of a road surface; and
   a motor adapted to be rotated by electric power supplied from the power generating elements through a power distribution system, and to rotationally drive the wheels through a driving-force transmission mechanism,
   wherein each of the power generating elements includes
   a core made of an electromagnetic material and disposed such that one end surface thereof is in contact with the inner peripheral surface of the tire and the other end surface is opposed to a rotational center of the tire, and
   a power generating coil made of an electrical conductive material and wound around a side surface of the core, the power generating coil having opposite ends each electrically connected to the power distribution system.

2. The electric vehicle as defined in claim 1, wherein the core is made of a permalloy or a supermalloy.

3. The electric vehicle as defined in claim 1, wherein a ground contact portion of the tire contains a ferromagnetic material.

4. The electric vehicle as defined in claim 1, wherein a ground contact portion of the tire is made of an elastic material containing one of a powder, a fiber and a net-like body of a ferromagnetic material.

5. The electric vehicle as defined in claim 4, wherein the ferromagnetic material contained in the ground contact portion of the tire is a permalloy or a supermalloy, and the elastic material is rubber.

6. The electric vehicle as defined in claim 1, which comprises a storage battery electrically connected to the power distribution system through a rectifier and an inverter, the storage battery being adapted, when a part of electric power generated by the power generating elements is unconsumed by the motor, to store the unconsumed electric power, and, when electric power generated by the power generating elements is less than a required electric power of the motor, or when no electric power is generated by the power generating elements, to supply the stored electric power to the motor.

7. An electric supply arrangement for supplying electric power to the electric vehicle as defined in claim 1, through electromagnetic induction, comprising magnetic field generation means disposed below and adjacent to a road surface, and adapted to generate a periodically changing magnetic field in a region above the road surface over a predetermined range with respect to a given direction.

8. The electric supply arrangement as defined in claim 7, wherein the magnetic field generation means includes: a plurality of magnetic-field generating elements disposed side-by-side in spaced-apart relation to each other in a given direction, each of the magnetic-field generating elements having a magnetic core and a winding; and a power source adapted to supply an alternating-current or pulsating-current power to the winding of each of the magnetic-field generating elements, and wherein:
   the magnetic core is made of a ferromagnetic material and disposed such that one end surface thereof is exposed to the road surface or located adjacent to the road surface; and
   the winding is made of an electrical conductive material and wound around a side surface of the magnetic core, the winding having opposite ends each electrically connected to the power source.

9. The electric supply arrangement as defined in claim 8, wherein the plurality of magnetic-field generating elements are disposed side-by-side in spaced apart relation to each other in an extending direction of a road.

10. The electric supply arrangement as defined in claim 7, wherein the magnetic field generation means includes:
    a plurality of lengthwise lines made of an electrical conductive material, and disposed inside a road and adjacent to a road surface thereof to extend parallel to each other along an extending direction of the road; and
    a power source adapted to supply an alternating-current or pulsating-current power to each of the lengthwise lines.

11. The electric supply arrangement as defined in claim 7, wherein the magnetic field generation means includes:
    a plurality of transverse lines made of an electrical conductive material, and disposed inside a road and adjacent to a road surface thereof to extend parallel to each other along an extending direction of the road; and
    a power source adapted to supply an alternating-current or pulsating-current power to each of the transverse lines.

* * * * *

UNITED STATES PATENT AND TRADEMARK OFFICE
CERTIFICATE OF CORRECTION

| | | |
|---|---|---|
| PATENT NO. | : 8,662,221 B2 | Page 1 of 1 |
| APPLICATION NO. | : 12/977253 | |
| DATED | : March 4, 2014 | |
| INVENTOR(S) | : Ryuji Ueno et al. | |

It is certified that error appears in the above-identified patent and that said Letters Patent is hereby corrected as shown below:

ON THE TITLE PAGE:

At item (73), correct the name of the Assignee to read as follows:

--Rusk Intellectual Reserve AG, Zug (CH)--.

Signed and Sealed this
Twenty-sixth Day of August, 2014

Michelle K. Lee
*Deputy Director of the United States Patent and Trademark Office*